(12) United States Patent
Kuhmuench

(10) Patent No.: US 9,430,665 B2
(45) Date of Patent: Aug. 30, 2016

(54) DYNAMIC AUTHORIZATION TO FEATURES AND DATA IN JAVA-BASED ENTERPRISE APPLICATIONS

(71) Applicant: Christoph Kuhmuench, Monmouth Junction, NJ (US)

(72) Inventor: Christoph Kuhmuench, Monmouth Junction, NJ (US)

(73) Assignee: Siemens Aktiengesellschaft, Munich (DE)

( * ) Notice: Subject to any disclaimer, the term of this patent is extended or adjusted under 35 U.S.C. 154(b) by 238 days.

(21) Appl. No.: 13/947,373

(22) Filed: Jul. 22, 2013

(65) Prior Publication Data

US 2015/0026208 A1    Jan. 22, 2015

(51) Int. Cl.
*G06F 17/30* (2006.01)
*G06F 21/62* (2013.01)

(52) U.S. Cl.
CPC ......... *G06F 21/6218* (2013.01); *G06F 21/629* (2013.01)

(58) Field of Classification Search
USPC ............ 707/781–788; 715/741–743; 726/17, 726/26–28
See application file for complete search history.

(56) References Cited

U.S. PATENT DOCUMENTS

| 6,202,066 | B1 |  | 3/2001 | Barkley et al. |
| 6,609,198 | B1 | * | 8/2003 | Wood ....................... G06F 21/31 713/155 |
| 6,691,232 | B1 | * | 2/2004 | Wood ................... H04L 63/0815 726/18 |
| 6,892,307 | B1 | * | 5/2005 | Wood ....................... G06F 21/41 713/155 |
| 6,950,825 | B2 |  | 9/2005 | Chang et al. |
| 7,124,192 | B2 |  | 10/2006 | High, Jr. et al. |
| 7,461,395 | B2 |  | 12/2008 | Ng |
| 7,546,640 | B2 |  | 6/2009 | Chang et al. |
| 7,703,021 | B1 |  | 4/2010 | Flam |
| 7,823,189 | B2 |  | 10/2010 | Patrick |
| 7,874,008 | B2 |  | 1/2011 | Chang et al. |
| 8,032,558 | B2 |  | 10/2011 | Carter et al. |
| 2004/0117358 | A1 | * | 6/2004 | von Kaenel et al. ............. 707/3 |
| 2004/0250098 | A1 | * | 12/2004 | Licis ................... G06F 21/6227 713/193 |
| 2005/0165829 | A1 | * | 7/2005 | Varasano .............. G06F 17/211 |
| 2006/0122861 | A1 | * | 6/2006 | Scott ...................... G06Q 10/00 705/7.19 |
| 2006/0143231 | A1 | * | 6/2006 | Boccasam et al. ........ 707/104.1 |
| 2007/0050340 | A1 | * | 3/2007 | von Kaenel et al. ............. 707/3 |
| 2007/0073894 | A1 | * | 3/2007 | Erickson ........... G06F 17/30864 709/230 |
| 2007/0113187 | A1 | * | 5/2007 | McMullen et al. ........... 715/742 |
| 2007/0156693 | A1 | * | 7/2007 | Soin ..................... G06F 21/604 |

(Continued)

OTHER PUBLICATIONS

Ferraiolo et al. "Role-based access control: Features and motivations", 1995, pp. 1-7.*

(Continued)

*Primary Examiner* — Hanh Thai

(57) ABSTRACT

Systems and methods are presented for dynamically controlling role-based access to enterprise applications. The access includes both a user's ability to access a requested functionality (hereinafter referred to as "features") in an enterprise applications, as well as the user's ability to access the specific data (and request filtering of the data) within the enterprise applications. The systems and methods provide dynamic control by utilizing a number of separate tables for identifying each element (user, role and feature), with join-tables used to define, on an active/customized basis, the association of each user with respect to a particular role (user_role join-table) and association of each feature with the listing of roles (feature_role join-table). The join-tables and specific element tables may be modified during runtime to modify any of the associations or listings.

13 Claims, 3 Drawing Sheets

(56) References Cited

U.S. PATENT DOCUMENTS

| | | | |
|---|---|---|---|
| 2007/0283443 A1* | 12/2007 | McPherson | G06F 21/6218 726/26 |
| 2008/0016580 A1* | 1/2008 | Dixit | G06F 21/604 726/27 |
| 2009/0089254 A1* | 4/2009 | Von Kaenel et al. | 707/3 |
| 2009/0133100 A1* | 5/2009 | Buchwald et al. | 726/3 |
| 2009/0254392 A1* | 10/2009 | Zander | G06F 21/6218 705/50 |
| 2009/0254572 A1* | 10/2009 | Redlich et al. | 707/10 |
| 2010/0114941 A1* | 5/2010 | Von Kaenel et al. | 707/769 |
| 2010/0115577 A1* | 5/2010 | Ratnala et al. | 726/1 |
| 2011/0004830 A1* | 1/2011 | Von Kaenel et al. | 715/751 |
| 2011/0321159 A1 | 12/2011 | Nestler et al. | |
| 2013/0111562 A1* | 5/2013 | Lee et al. | 726/4 |
| 2015/0288671 A1* | 10/2015 | Chan | H04L 29/08 726/1 |

OTHER PUBLICATIONS

Sandhu et al. "Role-based access control models", IEEE Computer, vol. 29, No. 29, Feb. 1996, pp. 38-47.*

* cited by examiner

DYNAMIC AUTHORIZATION TO FEATURES AND DATA IN JAVA-BASED ENTERPRISE APPLICATIONS

TECHNICAL FIELD

The present invention relates to providing authorization control in a database system and, more particularly, to providing dynamic adjustments of roles and features in a role-based authorization system.

BACKGROUND OF THE INVENTION

In a networked environment, users have access to resources on the network. In order to access these resources, the network uses a security process requiring a user to log onto the network with a user identifier and password. After network verification, the user has access to the resources on the network.

Oftentimes, organizations wish to restrict generalized access to resources on the network to prevent security breaches, such as infiltration and corruption, as well as to ensure proper management, such as configuration, administration, operation and monitoring of resources. Prior attempts to restrict access include the use of policy-based authorization or role-based authorization. Policy-based authorization is a technique that assigns access control policies to a user or group of users for permitted actions on the resources, that is "permissions". The permissions may include a variety of actions, such as starting, stopping, editing, writing, reading, etc. a given resource.

Role-based authorization is an alternative approach to access control that is based on assigning users to "roles", where a role defines a collection of specific actions that can be performed on a specific set of resources. In a typical role-based system, access to an object within a computer system is provided to the members of a group that all have the same "role"; that is, all subjects belonging to a given role have the same privileges to access various objects within the system. Individuals are then granted access to objects by being assigned membership in appropriate roles. Role-based access control is preferred in most enterprise situations, since the various roles can be defined to align with various responsibilities and duties within a given organization (e.g., in a business, the roles may be "marketing", "accounting", "engineering", and the like).

While preferable for these reasons, role-based access control to enterprise applications is provided in only a static configuration. That is, the set of users and the roles associated with each user are fixed at compile time. Additionally, the various functionalities associated with each role (hereinafter referred to as "features") are also fixed at compile time. As a result, a user only gains use of a feature if one of the user's roles is associated with that feature at compile time.

Thus, it would be desirable to provide dynamic management of these functions, i.e., allowing for modifications of the roles assigned to users, as well as the features assigned to roles, during runtime of enterprise applications.

SUMMARY OF THE INVENTION

The needs remaining in the prior art are addressed by the present invention, which relates to providing authorization control in a database system and, more particularly, to providing dynamic adjustments of roles and features in a role-based authorization system.

In accordance with one embodiment of the present invention, separate tables are used to list all users, roles and features. A first join-table (defined as a user_role join-table) is used to map each user to its defined roles and a second join-table (defined as a feature_role join-table) is used to map each feature to each applicable role. The ability for a user to access a particular feature will be based on the user's particular permissible roles (as defined by the user_role join-table), as well as the features associated with each role (defined by the feature_role join-table).

The ability to update the join-tables in real time creates a dynamic arrangement for managing the ability of various users to access the features. Both the set of roles and the set of features may be updated in real time, as well as the join-tables linking the users with roles and features with roles.

In a further embodiment of the present invention, additional access permissions to selected attributes (data) of various features, as well as filtering of the data, are provided through additional join-tables between the role table and the data. Specific queries performed on the database may be cached to improve processing speed.

In an exemplary embodiment, the present invention comprises a computer-implemented method of controlling access to enterprise applications including the steps of: storing information for a plurality of users in a user table (identifying each user by a unique login used as a primary key), storing information for a plurality of roles in a role table (identifying each role by a unique name as a primary key) and storing information for a plurality of features in a feature table (identifying each feature by a unique name as a primary key). The method also includes the steps of creating a first join-table for mapping users to roles, using their respective primary keys and predetermined assignments of users to roles and a second join-table for mapping features to roles, using their respective primary keys and predetermined assignments of features to roles, where the method then permits a user to access a requested feature if and only if the requested feature is associated with a role assigned to the user.

In another embodiment, the present invention discloses a system for providing dynamic management of roles and features in enterprise applications comprising a memory module for storing information for a plurality of users in a user table, identifying each user by a unique login used as a primary key, and information for a plurality of roles in a role table, identifying each role by a unique name as a primary key and information for a plurality of features in a feature table, identifying each feature by a unique name as a primary key and a processor for creating a first join-table for mapping users onto selected roles and a second join-table for mapping features onto selected roles, the first and second join-tables then stored in the memory module, wherein when a user requests access to a selected feature, the processor is queried to determine if the selected feature is associated with a role assigned to the user.

BRIEF DESCRIPTION OF THE DRAWINGS

Referring now to the drawings.

DETAILED DESCRIPTION

The present invention, as described in detail below, provides a methodology for providing fine-grained, dynamic access control to features and data in enterprise applications. Prior to describing these details, it is considered beneficial to understand the underlying concepts of database management in an enterprise environment.

In most database architectures, the enterprise applications (i.e., the programs utilized to permit individuals (users) to gain entry to and use the information stored in the database) need to authorize a user's access on three different levels: (1) access control on a per feature level; (2) access control to the specific data stored in the system; and (3) filtering of requested data to return properly limited results. As noted above, current systems utilize a static system to provide access to features, i.e., roles and features access are fixed at compile time and an individual user can only access those features that are specifically associated with an assigned role. Further, there is no current methodology for supporting authorization for the remaining levels mentioned above (data access and data filtering).

Typically, access to functionality and data must be restricted. While access to functionality (hereinafter referred to as "features") is controlled on a "per call" basis, access to data requires adding permissions to manipulate the data itself, as well as filtering of the data. In accordance with the present invention, the ability to dynamically control and manage a user's access to functionality (hereinafter referred to as "features"), as well as data and the filtering of the data is provided by utilizing a number of separate tables for identifying each element, with join-tables used to define, on an active/customized basis, the association of each group of elements with respect to a particular "role".

Figure 1:
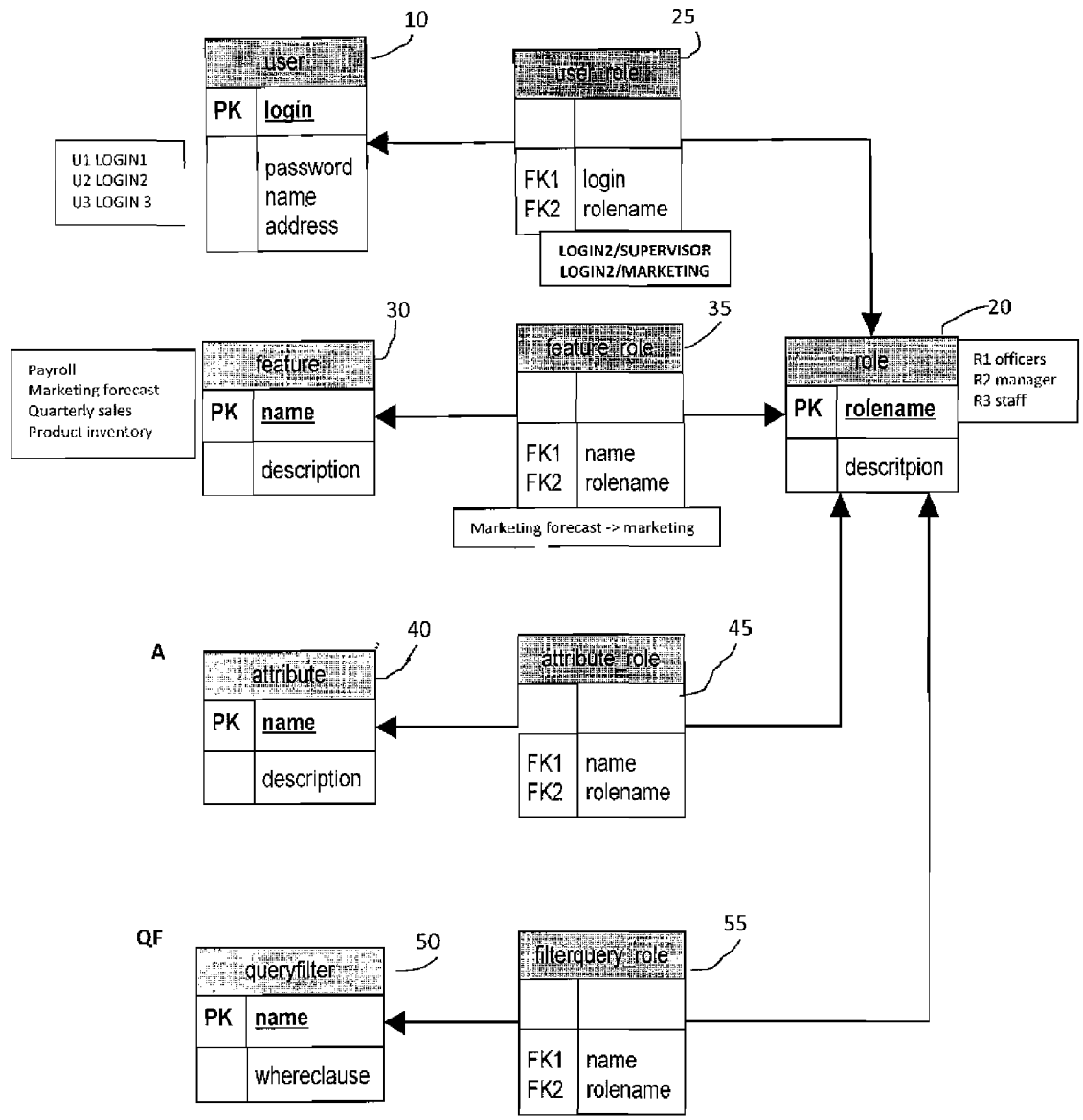
FIG. 1 is a diagram illustrating the join-table methodology of the present invention.

FIG. 1 illustrates the methodology of the present invention, utilizing join-tables that can be updated as needed to modify both the roles assigned to specific users, as well as the features assigned to roles (including adding new roles and/or features to the system, or deleting selected roles and/or features from the system). A user table 10 is shown as being populated by a plurality of users U1, U2, U3, . . . . As shown, each user is defined by his/her "login" as a primary key (PK), and the listing includes the user's password, name and address. For the sake of example, it will be presumed that the system has three users, U1, U2 and U3, with logins of LOGIN1, LOGIN2 and LOGIN3, respectively.

A role table 20 is shown as being populated by a plurality of roles R1, R2, R3, . . . . In this table, each role is defined by its "rolename", which is used as the primary key. For the sake of example, it is presumed that the system is tasked with executing applications in a corporate database system. The specific roles in this example, as defined by the rolenames, may include elements such as "officers", "managers", "finance", "engineering", "marketing", "supervisors" and "staff". It is clear that one user may have more than one role, such as manager in the accounting department, who would have both the "manager" and "finance" roles, or a supervisor in the engineering department, who would have both the "supervisor" and "engineering" roles.

In prior art database management organizations using role-based access authorization, each role would have a number of assigned features, and a user would be granted/denied permission to access a particular feature based upon his/her assigned roles. As mentioned above, the roles were assigned to the users at compile time (similarly, the features were assigned to the roles at compile time), and each "rule-based" call would be based upon the static organization of data.

In accordance with the present invention and as shown in FIG. 1, a separate user_role join-table 25 is used to map the users into one or more of the specified roles. User_role join-table 25 is shown as using a pair of foreign keys (FK), the PKs from both user table 10 and role table 20. Thus, by keeping the users and roles in separate tables and using user_role join-table to map the users to the roles, the specific entries in join-table 25 can be modified as needed during execution to modify the mapping between the users and the roles. For example, if user U2 is promoted from "staff" to "manager", join table 25 is modified to reflect this update. The basic information within both user table 10 and role table 20 remains intact in this scenario. It is also possible that role table 20 is updated on an on-going basis by adding roles to and/or removing roles from role table 20. Each time a role is added to table 20, user_role join table 25 is modified to map selected users to this new role.

Further in accordance with the present invention, features are listed in a separate feature table 30. This listing is exhaustive of all possible functionalities, as well as each method of a class that requires access control. A PK for use with feature table 30 is shown as the "name" of a feature (such as, for example, "payroll", "marketing forecast", "quarterly sales", "product inventory", etc.). A feature_role join-table 35 is created to map the complete set of features with all of the identified roles in the system, with the pair of FKs in this join-table comprising the pair of PKs from feature table 30 and role table 20.

In accordance with the present invention, if a specific user desires to access a feature, a search is made to see of any of the user's defined roles give permission to access the requested feature, where this process uses both user_role join-table 25 and feature_role join-table 35 to make this determination.

Figure 2:
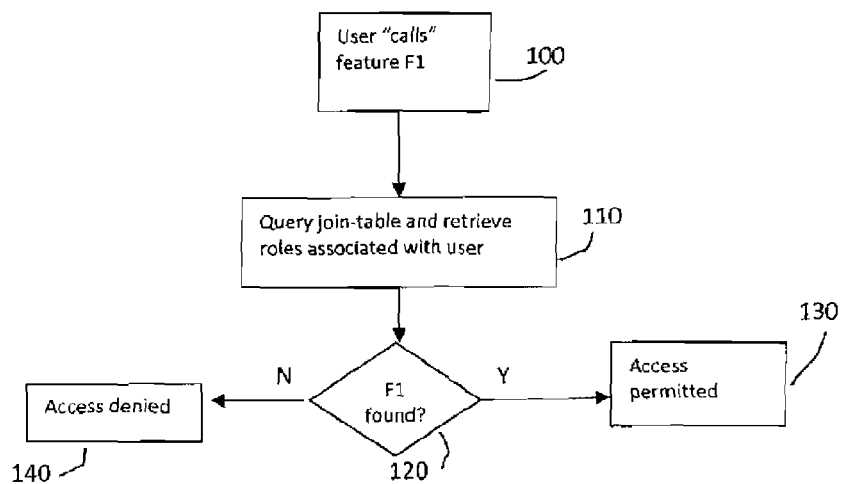
FIG. 2 is a flowchart illustrating the use of join-tables to control a user's access to a requested feature in an enterprise application.

A flowchart as shown in FIG. 2 illustrates how these various tables and join-tables interact to provide fine-grained access control to database structures in accordance with the present invention. When a user submits a "call" for a particular feature F1 (step 100), the process first checks the roles assigned to that user (step 110) via join-table 25. With this knowledge of the specific roles assigned to the user, the process continues by checking feature_role join-table 35 to see if the requested feature F1 is associated with any of the user's assigned roles (step 120). If one of the user's roles shows up during this search, the user is granted access (step 130), otherwise access to the requested feature is denied (step 140). As compared to the prior art, this two-step approach allows for the features to be separated from the specific roles, such that the linkage between them can be modified over time.

For example, suppose user U2 wants to access the marketing forecast information in the database system, where as shown in FIG. 1 the roles associated with U2 are "supervisor" and "marketing". User U2 initiates a database "call" for "marketing forecast" and the inventive process functions to first check U2's roles and finds that one assigned role is "marketing". The feature "marketing forecast" is shown to be mapped into this role (in join-table 35) and, therefore, U2 is granted permission to access the marketing forecast information.

In accordance with the present invention, an improvement over the prior art is provided in that the relationship between the users and their roles is no longer fixed at compile time. Instead, at any time during execution of an application, either of the join-tables can be updated to modify the specific roles associated with each user, or modify the specific features associated with each role (i.e., "dynamic" management of access control). Users, roles and features may also be added to or deleted from the various tables (with the join-tables updated accordingly).

Summarizing, the organization as described above to utilize independent tables of users, roles and features, with join-tables mapping both the users and the features with the roles, allows for dynamic management of database access in accordance with the present invention, addressing the first level of need as mentioned above.

The next aspect that is addressed by the use of join-tables in accordance with the present invention regards access control to the data itself that is stored within a given system, mentioned above as the "second level" of access associated with enterprise applications. Returning to FIG. 1, a separate "attribute" table 40 is shown, where the attribute "name" is used as the PK for this table. Various attribute names may include, for example, "read only", "edit", "share", "delete", and the like. Attribute table 40 is used for the more complex step related to authorizing access to data entries in a structured query language (SQL) database. In many of today's systems, object-relational mapping mechanisms are used to map class objects (the key element of object-oriented languages) to tables in a database. In Java, for example, the standardized mechanism for this mapping is a Java Persistence API (JPA). Essentially, JPA maps attributes of an object to columns in a database table when it persists that object. However, JPA does not include a standardized API to define access control to attributes as used herein.

Referring to the arrangement of FIG. 1, a methodology is proposed that functions as a basis for a standardized API to add attribute access control to a query such as that utilized with JPA. A standardized annotation, here defined as @AccessControl, is used to determine if a specific system user has the proper permissions to access a given attribute. As with the arrangement described above, an attribute_role join-table 45 is used to map attributes as contained in table 40 to the roles as defined in table 20, using the PKs from attribute table 40 and role table 20. As shown, join-table 45 identifies the specific attribute(s) as associated with the various roles.

Figure 3:
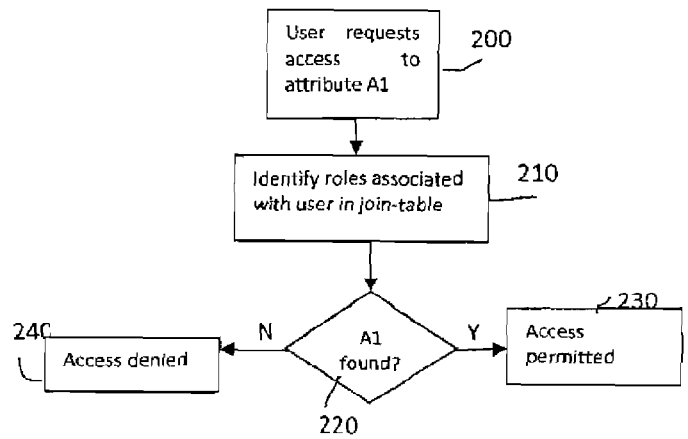
FIG. 3 is a flowchart illustrating the use of join-tables to control a user's ability to access a selected attribute.

FIG. 3 contains a flowchart that illustrates the process of using this aspect of the present invention. To begin, a user requests access to a particular attribute A1 (step 200). The user's roles are identified (step 210), and attribute_role join table 45 is searched to see of any of the user's roles grant access to the specific attribute (step 220). Access to the requested attribute is then permitted (step 230) or denied (step 240), based on the results of this search. Continuing with the scenario discussed above, it is presumed that user U2 wants to update a marketing forecast. This will only be permissible if the "update" attribute is associated with the "marketing" role within role table 20.

In another embodiment of the present invention, an increase in performance of providing access to selected data in a database system is provided by adding a filtering step to the above-described query process. That is, the approach as described to this point controls access to protected attributes, but does not prevent the object-relational mapping framework (i.e., hibernate) from retrieving more data than is required by the user. Loading data from the database is known to be one source of sluggish performance of an enterprise application, so it would be useful to only load the specific data required by the user, and not all of the data associated with the called attribute.

In accordance with the present invention, this problem is addressed by adding a filter to a query before it is executed. Again, an annotation-based API is used to define a filter, where a number of filters are stored in a database table, shown as queryfilter table 50 in FIG. 1. A filterquery_role join-table 55 is used to map filters with the various system roles. Any query executed against this class will be filtered according to the query filter. Indeed, as mentioned above, the query is modified to incorporate the filter into the original statement so that the query only returns the allowed results. In the present scenario, the filter may permit only "US"-based marketing forecasts to be accessible to, and modified by, user U2. The "US" filter will thus limit the data retrieved from the database in the first instance, improving the responsiveness of the system.

In a further embodiment of the present invention, further improvements in performance are obtained by storing the filter-modified queries in a cache so that if the same filter is again required, its execution time will be shorter than the first run. In a preferred arrangement, a hash value of the query is created and stored in a hash map. Access control information can also be cached and then available when a user signs in.

Figure 4:
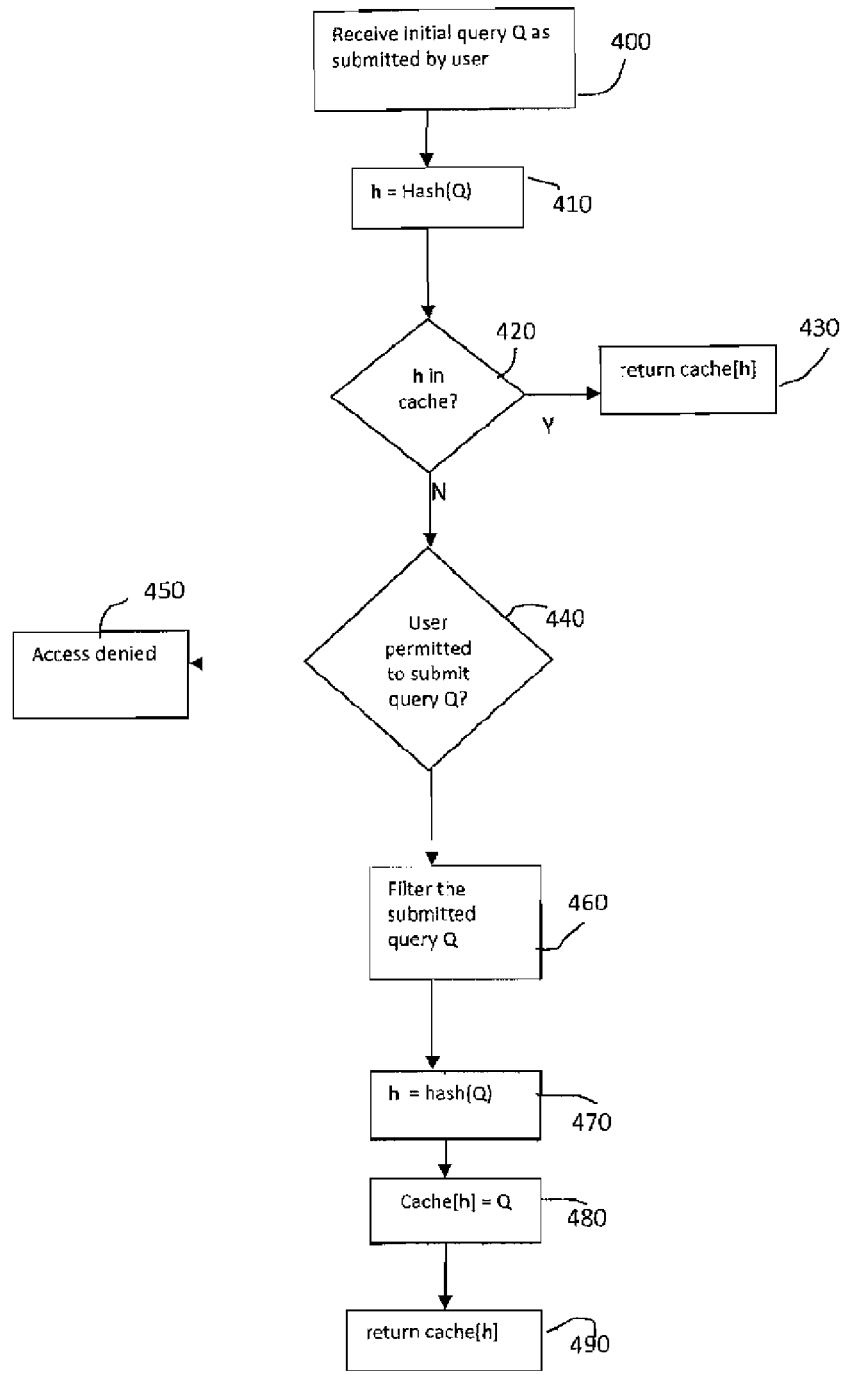
FIG. 4 is a flowchart illustrating the use of a cache for storing executed query filters in accordance with the present invention.

FIG. 4 is a flowchart illustrating the use of a cache in this environment. As shown, the process begins at step 400 by determining the specific query submitted to the database. A hash of the query is then generated in step 410, using a pre-defined hash function (e.g., SHA-1, SHA-2, etc.). The results of this hash are then compared against the entries stored in a hash table (step 420). If there is a match, then the results are returned (step 430) and there is no need for the system to again process the requested query filter.

Presuming the query filter is not found in the cache, the process continues by first determining if the current user has permission to submit this query (step 440). If the response is negative, further processing is denied (step 450). Presuming the user is permitted to perform the query, the process proceeds to step 460 where the query filtering action is performed. A hash of this result is then performed (step 470) and added to the cache (step 480), while also returning the results to the process (step 490).

The following illustrates the principles of the invention as embodied in a JPQL query, using an Entity Address as shown. The first query shown below selects the complete set of attributes associated with the class "Address", while the following query is modified to exclude access to houseValue:

```
@Entity
@ReturnFilter
class Address        {
    Person owner;
    String street;
    String city;
    @AccessControl
    Double houseValue;
    @OneToMany
    List<Person> inhabitants;
JPQL query:
SELECT a FROM Address a;
Modified JPQL query:
SELECT a.street,a.city,a.zip,a.inhabitants FROM Address a;
```

As shown, the modified query will limit the information that is returned so that only the necessary data will be sent, significantly reducing the loading time of the information. The following query then further modifies this approach by adding the filtering process:

```
Modified JPQL query with a filter:
    SELECT a.street,a.city,a.zip,a.inhabitants FROM Address a
        WHERE owner.name="Mueller";
```

Clearly, the addition of a filter will reduce the amount of information retrieved.

Summarizing, the present invention allows for dynamic authorization to be utilized to access features and data in a Java-based EA. Heretofore, Java EE does not support dynamic authorization, and it also does not support access control to, and filtering of, data in relational databases.

In accordance with the present invention, access control has been developed for specific, individual situations, allowing for dynamic authorization to be utilized. The proposed framework allows for defining access restrictions in a declarative way that is relatively straightforward to maintain without compromising performance.

As will be appreciated by one of skill in the art, embodiments of the present invention may be provided as methods, systems, or computer program products. Accordingly, the present invention may take the form of an entirely hardware embodiment, an entirely software embodiment or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flowcharts and/or block diagrams of methods, apparatus (systems) and computer program products according to embodiments of the invention. It will be understood that each flow and/or block of the flowcharts and/or block diagrams, and combinations of flows and/or blocks in the flowcharts and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flowchart flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart flow or flows and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart flow or flows and/or block diagram block or blocks.

While the preferred embodiments of the present invention have been described, additional variations and modifications in those embodiments may occur to those skilled in the art once they learn of the basic inventive concepts. Therefore, it is intended that the appended claims shall be construed to include both the preferred embodiments and all such variations and modifications as fall within the spirit and scope of the invention.

What is claimed is:

1. A computer-implemented method of controlling access to enterprise applications, the method comprising the steps of:
    storing information for a plurality of users in a user table, identifying each user by a unique login used as a primary key;
    storing information for a plurality of roles in a role table, identifying each role by a unique name as a primary key;
    storing information for a plurality of features in a feature table, identifying each feature by a unique name as a primary key;
    creating, by a processor, a first join-table for mapping users to roles, using their respective primary keys as a pair of foreign keys to assign users to roles;
    creating, by the processor, a second join-table for mapping features to roles, using their respective primary keys as a pair of foreign keys to assign features to roles; and
    permitting, by the processor, a user to access a requested feature if and only if the requested feature is assigned to a role in the second join-table which is also assigned to the user in the first join-table.

2. The method as defined in claim 1 wherein the method is dynamic by permitting the first and second join-tables to be updated during run time to modify the assignments between the objects.

3. The method as defined in claim 1 wherein the method is dynamic by permitting the user table, role table and feature table to be updated during run time.

4. The method as defined in claim 1 wherein the method is further capable of controlling presentation of queries to enterprise applications and includes the steps of:
    storing information regarding a plurality of attributes in an attribute table,
    identifying each attributed by a unique name as a primary key; and
    creating a third join-table for mapping attributes to roles, using their respective primary keys as a pair of foreign keys to assign attributes to roles;
    permitting a user to submit a query based on a selected attribute if and only if the selected attribute is assigned by the third join-table to a role assigned to the user in the first join-table.

5. The method as defined in claim 4, wherein the method further comprises an ability to filter a submitted query to eliminate unwanted information from being returned in response to a query, the method further comprising the steps of:
    storing a plurality of filtering options in a filter table, identifying each query filter by a unique name as a primary key; and
    creating a fourth join-table for mapping filters to roles, using their respective primary keys as a pair of foreign keys to assign filters to roles; and permitting a user to submit a filtered query based on a selected filter and query if and only if the selected filter is assigned in the fourth join-table to a role assigned to the user in the first join-table.

6. A system for providing dynamic management of roles and features in enterprise applications comprising
a memory module for storing information for a plurality of users in a user table, identifying each user by a unique login used as a primary key, and information for a plurality of roles in a role table, identifying each role by a unique name as a primary key and information for a plurality of features in a feature table, identifying each feature by a unique name as a primary key; and
a processor for creating a first join-table for mapping users onto selected roles, utilizing the user primary key and role primary key as foreign keys to define an assignment of users to roles, and a second join-table for mapping features onto selected roles, utilizing the feature primary key and role primary key as foreign keys to define an assignment of features to roles, the first and second join-tables stored in the memory module, wherein when a user requests access to a selected feature, the processor is queried to determine if the selected feature is assigned in the second join-table to a role assigned to the user in the first join-table.

7. The system as defined in claim 6 wherein the memory module is updated as required to modify listings of the users, roles and features.

8. The system as defined in claim 6 wherein the first join-table in the memory module is updated as required to modify the mappings between the users and the roles.

9. The system as defined in claim 6 wherein the second join-table in the memory module is updated as required to modify the mappings between the features and the roles.

10. The system as defined in claim 6 wherein the memory module further comprises a table of predefined attributes and a join-table mapping the predefined attributes to the roles.

11. The system as defined in claim 10 wherein the memory module further comprises a table of query filters and a join-table mapping the query filters to the roles.

12. The system as defined in claim 11 wherein the system further comprises a cache for storing executed query filters.

13. The system as defined in claim 12 wherein the executed query filters are hashed and a hash value is used to query the cache.

* * * * *